United States Patent [19]

Haaf et al.

[11] 4,355,126

[45] Oct. 19, 1982

[54] FLAME RETARDANT, NON-DRIPPING COMPOSITIONS OF POLYPHENYLENE ETHER AND ACRYLONITRILE-BUTADIENE-STYRENE

[75] Inventors: William R. Haaf, Voorhesville, N.Y.; Donald L. Reinhard, Lenox, Mass.

[73] Assignee: General Electric Company, Pittsfield, Mass.

[21] Appl. No.: 15,103

[22] Filed: Feb. 26, 1979

Related U.S. Application Data

[63] Continuation of Ser. No. 530,373, Dec. 6, 1974, abandoned.

[51] Int. Cl.$^3$ ............................ C08K 3/10; C08K 3/16
[52] U.S. Cl. ..................... 524/411; 524/80; 524/123; 524/126; 524/127; 524/128; 524/129; 524/154; 524/341; 524/412; 524/469; 524/470; 524/471; 525/68; 525/905
[58] Field of Search ............... 525/68, 390, 905; 260/45, 7 R, 7 P, 7 PH, 45.95, 45.75; 528/132; 524/80, 341, 411, 412, 469, 470, 471, 123, 126, 127, 128, 129, 154

[56] References Cited

U.S. PATENT DOCUMENTS

| | | | |
|---|---|---|---|
| 2,505,349 | 4/1950 | Daly | 525/132 |
| 2,550,139 | 4/1951 | Daly | 525/132 |
| 2,698,313 | 12/1954 | Daly | 525/132 |
| 2,713,566 | 7/1955 | Reid | 525/132 |
| 2,820,773 | 1/1958 | Childers et al. | 525/132 |
| 2,908,661 | 10/1959 | Calvert | 525/132 |
| 3,219,626 | 11/1965 | Blanchard et al. | 528/132 |
| 3,257,357 | 6/1966 | Stamatoff | 528/132 |
| 3,257,358 | 6/1966 | Stamatoff | 528/132 |
| 3,306,874 | 2/1967 | Hay | 528/132 |
| 3,306,875 | 2/1967 | Hay | 528/132 |
| 3,330,806 | 7/1967 | Borman | 528/182 |
| 3,342,892 | 9/1967 | Laakso et al. | 528/132 |
| 3,344,116 | 9/1967 | Boman | 528/132 |
| 3,356,761 | 12/1967 | Fox | 528/132 |
| 3,357,499 | 8/1967 | Bussink | 528/132 |
| 3,382,212 | 5/1968 | Price et al. | 528/132 |
| 3,383,435 | 5/1968 | Cizek | 525/132 |
| 3,384,619 | 5/1968 | Hori | 528/132 |
| 3,440,217 | 4/1969 | Faurote et al. | 528/132 |
| 3,442,885 | 5/1969 | Wieden et al. | 528/132 |
| 3,455,880 | 7/1969 | Kobayashi | 528/132 |
| 3,573,257 | 3/1971 | Nakashio et al. | 528/132 |
| 3,671,487 | 6/1972 | Abolins | 260/40 R |
| 3,809,729 | 5/1974 | Reinhard | 525/132 |
| 4,128,602 | 12/1978 | Katchman et al. | 525/132 |

FOREIGN PATENT DOCUMENTS

| | | | |
|---|---|---|---|
| 698385 | 10/1953 | United Kingdom | 528/132 |
| 1291609 | 11/1972 | United Kingdom | 528/132 |
| 1344093 | 1/1974 | United Kingdom | 528/132 |

*Primary Examiner*—J. Ziegler
*Attorney, Agent, or Firm*—Hedman, Casella, Gibson & Costigan

[57] ABSTRACT

The present invention provides novel flame retardant, non-dripping thermoplastic molding compositions of polyphenylene ether resins or acrylonitrile-butadiene-styrene copolymers which include a flame retardant agent, and polytetrafluoroethylene.

15 Claims, No Drawings

FLAME RETARDANT, NON-DRIPPING COMPOSITIONS OF POLYPHENYLENE ETHER AND ACRYLONITRILE-BUTADIENE-STYRENE

This is a continuation of application Ser. No. 530,373 filed Dec. 6, 1974, abandoned.

This invention relates to flame retardant, non-dripping thermoplastic molding compositions of a polyphenylene ether resin or an acrylonitrile-butadiene-styrene or alpha-methyl styrene copolymer which include a flame retardant agent and polytetrafluoroethylene.

BACKGROUND OF THE INVENTION

The polyphenylene ether resins and acrylonitrile-butadiene-styrene or alpha-methyl styrene (ABS) resins are well known thermoplastic materials that are commercially available. Both of these materials are flammable and require the use of additives to achieve a commercially acceptable degree of flame retardancy.

If a thermoplastic test bar burns vigorously enough for a sufficient time, the bar will gradually soften (absent an unexpected crosslinking reaction) and will begin to exhibit sagging. As the bar becomes softer and less viscous, a point will be reached at which the bottom portion of the bar will separate physically from the remainder of the bar retained in the test stand. This phenomenon is known as "dripping".

In the prior art there have been problems in preparing flame retardant compositions of these materials which did not form flaming droplets when they are ignited with a direct flame.

U.S. Pat. No. 3,671,487 disclosed a non-dripping linear polyester molding composition that employs a glass reinforcement, a flame retardant additive and a polytetrafluoroethylene resin. This reference employed about 0.5 to 2.5 parts by weight per hundred parts of composition of polytetrafluoroethylene.

Applicants have found that it is possible to achieve a flame retardant, non-dripping polyphenylene ether molding composition by the addition of a flame retardant compound and from 0.1 to 0.25 parts by weight per hundred parts of composition of polytetrafluoroethylene. In the case of ABS, a flame retardant compound and from 0.5 to 3 parts by weight per hundred parts of composition will be sufficient to produce a flame retardant non-dripping composition without a glass reinforcement. Accordingly, it is a primary object of the present invention to prepare flame retardant, non-dripping molding compositions of polyphenylene ether resins and ABS resins.

It is also an object of the present invention to provide flame retardant non-dripping molding compositions of polyphenylene ether resins and ABS resins that have physical properties which are not appreciably affected by the presence of the flame retardant-drip preventing system.

DESCRIPTION OF THE INVENTION

According to the present invention there are provided flame retardant, non-dripping thermoplastic molding compositions which comprise:

(a) a normally flammable polyphenylene ether resin or ABS;

(b) a flame retardant additive in a minor proportion based on said thermoplastic molding composition but in an amount sufficient to render said thermoplastic composition non-burning or self-extinguishing;

(c) a polytetrafluoroethylene resin in a minor proportion based on said thermoplastic molding composition in an amount at least sufficient to render said thermoplastic molding composition non-dripping.

The term "polyphenylene ether resin" includes a family of polymers well known to those skilled in the art, and they are made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al, U.S. Pat. No. 3,337,499; Blanchard et al, U.S. Pat. No. 3,219,626; Laakso et al, U.S. Pat. No. 3,342,892; Borman, U.S. Pat. No. 3,344,166; Hori et al, U.S. Pat. No. 3,384,619; Faurote et al, U.S. Pat. No. 3,440,217; and disclosures relating to metal based catalysts which do not include amines, are known from patents such as Wieden et al, U.S. Pat. No. 3,442,855 (copper-amidines); Nakashio et al, U.S. Pat. No. 3,573,257 (Metal-alcoholate or -phenolate); Kobayashi et al, U.S. Pat. No. 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al, U.S. Pat. No. 3,382,212. Cizek, U.S. Pat. No. 3,383,435 discloses polyphenylene ether-styrene resin compositions. All of the above-mentioned disclosures are incorporated herein by reference.

The polyphenylene ether resins are preferably of the type having the repeating structural formula:

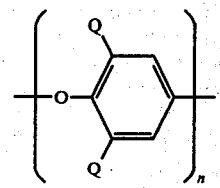

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha carbon atom, halohydrocarbon radicals having at least two carbon atoms between the halogen atom and the phenyl nucleus, hydrocarbonoxy radicals and halohydrocarbonoxy radicals having at least two carbon atoms.

The preferred polyphenylene ether resin is poly(2,6-dimethyl-1,4-phenylene) ether resin.

The compositions which include a polyphenylene ether resin may also include a vinyl aromatic resin. The vinyl aromatic resins are homopolymers or copolymers having at least 25% of their units derived from a monomer having the formula:

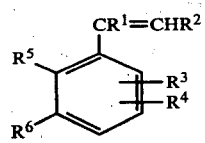

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbons or $R^5$ and $R^6$ may be concatenated together with hydrocarbyl groups to form a naphthyl group.

Materials that may be copolymerized with the units of the vinyl aromatic monomer include those having the general formula:

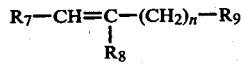

wherein $R_8$ and $R_7$ represent a substituent selected from the group consisting of hydrogen, halogen, an alkyl group of 1-4 carbon atoms, carboalkoxy or $R_7$ and $R_8$ taken together represent an anhydride linkage (—COOOC—) and $R_9$ is hydrogen, vinyl, an alkyl or alkenyl group having 1 to 12 carbon atoms, cycloalkyl, carboalkoxy, alkoxy-alkyl, alkyl carboxyl, ketoxy, halogen, carboxy, cyano or pyridyl and n is a whole number between 0 and 9.

The general formula set forth includes by way of example, homopolymers such as polystyrene and polymonochlorostyrene, the modified polystyrenes, such as rubber-modified, high-impact polystyrene and the styrene containing copolymers, such as the styrene acrylonitrile copolymers, styrene butadiene copolymers, styrene-acrylonitrile-α-alkyl styrene copolymers, styrene-acrylonitrile-butadiene copolymers, poly-α-methylstyrene, copolymers of ethylvinyl benzene, and divinylbenzene styrene-maleic anhydride copolymers and styrene-butadiene block copolymers.

The rubber modified high impact polystyrenes may be made with diene rubbers such as butadiene rubber, styrene-butadiene rubber, acrylonitrile rubber or ethylene-propylene copolymers or EPDM rubber.

The ABS copolymers are well known and many suitable types are commercially available. Either an acrylonitrile-butadiene-styrene or an acrylonitrile-butadiene-alpha-methyl styrene may be used as the ABS component. A useful method for preparing these copolymers comprises grafting 73 parts styrene and 42 parts acrylonitrile onto polybutadiene latex containing 58 parts polybutadiene in the presence of 3 parts soap, 1.7 parts marcaptan and 0.4 parts potassium peroxydisulfate at 50° C. The latex is coagulated and the product is then milled for 10 minutes at 320° F. Other useful methods for preparing these copolymers may be found in U.S. Pat. Nos. 2,505,349; 2,550,139; 2,698,313; U.K. Pat. No. 698,385; U.S. Pat. Nos. 2,713,566; 2,820,773; and 2,908,661, all of which are hereby incorporated by reference.

The compositions of the invention may comprise from 10–95 parts by weight of the polyphenylene ether resin or the ABS resin. If a vinyl aromatic resin is combined with the polyphenylene ether resin it may comprise from 5 to 90 parts by weight. The flame retardant component may comprise from 2.0 to 25 parts by weight per hundred parts by weight of the composition and polytetrafluoroethylene may comprise from 0.1 to 3 parts by weight per hundred parts by weight of composition.

The nature of the flame retardant component is not critical and single compound may be used. Optionally, it may be found desirable to use as the flame retardant component, a mixture of two or more individual flame retardant compounds.

Among the useful flame retardant compounds are those of the formula:

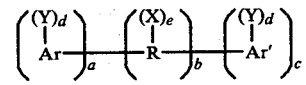

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; a sulfur-containing linkage, e.g., sulfide, sulfoxide, sulfone, carbonate; a phosphorus-containing linkage; and the like. R can also consist of two or more alkylene or alkylidene linkages connected by such groups as aromatic, ether, ester, carbonyl, sulfide, sulfoxide, sulfone, a phosphorus-containing linkage, and the like. R can be a dihydric phenol, e.g., bisphenol-A, carbonate linkage. Other groups which are represented by R will occur to those skilled in the art.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) other groups of the general formula, OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g., phenyl nucleus.

X is a monovalent hydrocarbon group exemplified by the following: alkyl, such as methyl, ethyl, propyl, isopropyl, butyl, decyl and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The latter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Where by is 0, the aromatic groups are joined by a direct carbon-to-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are diaromatics of which the following are representative:

2,2-bis-(3,5-dichlorophenyl)propane
bis(2-chlorophenyl)methane
bis(2,6-dibromophenyl)methane
1,1-bis-(4-iodophenyl)ethane
1,2-bis(2,6-dichlorophenyl)ethane
1,1-bis(2-chloro-4-iodophenyl)ethane
1,1-bis(2-chloro-4-methylphenyl)ethane
1,1-bis(3,5-dichlorophenyl)ethane
2,2-bis(3-phenyl-4-bromophenyl)ethane
2,3-bis(4,6-dichloronaphthyl)propane
2,2-bis(2,6-dichlorophenyl)pentane
2,2-bis(3,5-dichlorophenyl)hexane
bis(4-chlorophenyl)phenylmethane
bis(3,5-dichlorophenyl)cyclohexylmethane
bis(3-nitro-4-bromophenyl)methane
bis(4-hydroxy-2,6-dichloro-3-methoxyphenyl)methane
2,2-bis(3,5-dichloro-4-hydroxyphenyl)propane
2,2-bis(3-bromo-4-hydroxyphenyl)propane The preparation of these and other applicable biphenyls are known in the art. In place of the divalent aliphatic group in the above examples may be substituted sulfide, sulfoxy and the like.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

In general, the preferred phosphate compounds are selected from elemental phosphorus or organic phosphonic acids, phosphonates, phosphinates, phosphonites, phosphinites, phosphine oxides, phosphines, phosphites or phosphates. Illustrative is triphenyl phosphine oxide. These can be used alone or mixed with hexabromobenzene or a chlorinated biphenyl and, optionally, antimony oxide.

Typical of the preferred phosphorus compounds to be employed in this invention would be those having the general formula

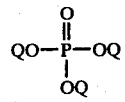

and nitrogen analogs thereof where each Q represents the same or different radicals including hydrocarbon radicals such as alkyl, cycloalkyl, aryl, alkyl substituted aryl and aryl substituted alkyl; halogen, hydrogen and combinations thereof provided that at least one of said Q's is aryl. Typical examples of suitable phosphates include, phenylbisdodecyl phosphate, phenylbisneopentyl phosphate, phenylethylene hydrogen phosphate, phenyl-bis-3,5,5'-trimethylhexyl phosphate), ethyldiphenyl phosphate, 2-ethylhexyl di(p-tolyl) phosphate, diphenyl hydrogen phosphate, bis(2-ethyl-hexyl) p-tolylphosphate, tritolyl phosphate, bis(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phsophate, p-tolyl bis(2,5,5'-trimethylhexyl) phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate in combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides or phosphinic acid amides. These flame-retardant additives are commercially available.

The preferred compounds for this invention are aromatic halogen compounds such as brominated benzene, chlorinated biphenyl, or a compound comprising two phenyl radicals separated by a divalent alkenyl group and having at least two chlorine or bromine atoms per phenyl nucleus, polycarbonates, chlorine containing aromatic polycarbonates, and mixtures of at least two of the foregoing.

Especially preferred are hexabromobenzene and triphenyl phosphate.

The compositions of the invention may also include reinforcing fillers, such as aluminum, iron or nickel, and the like and non-metals, such as carbon filaments, silicates, such as acicular calcium silicate, asbestos, titanium dioxide, potassium titanate and titanate whiskers, glass flakes and fibers. It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperature.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

In general, best properties will be obtained if the sized filamentous glass reinforcement comprises from about 1 to about 80% by weight based on the combined weight of glass and polymers and preferably from about 10 to about 50% by weight. Especially preferably the glass will comprise from aout 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70-80% by weight of glass. These concentrates can then be custom blended with blends of resins that are not glass reinforced to provide any desired glass content of a lower value.

The length of glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛" to about 1" long, preferably less than ¼" long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005" and 0.125 (⅛").

The composition of the invention may be prepared by tumbling the components, extruding the mixture thus obtained into a continuous strand, chopping the strand into pellets and thereafter molding the pellets into the desired shape. These techniques are well known to those skilled in this art and are not a critical feature of the invention.

DESCRIPTION OF THE PREFERRED EMBODIMENTS

The present invention is further illustrated in the following examples which are set forth as a further description of the invention.

EXAMPLES 1-6

Blends were prepared and test samples were made as described in Table I. All of the numbers refer to parts by weight.

TABLE I

| Example | poly(2,6-dimethyl-1,4-phenylene) ether | rubber modified high impact polystyrene[1] | polyethylene | TBBPA[2] | TPP[3] | AO[4] | PTFE[5] | UL-94 Self-Extinguishing Times (Sec.) |
|---|---|---|---|---|---|---|---|---|
| 1* | 20 | 80 | 1.5 | 10 | — | 3 | — | (1/8") 1/1,1/9,4/8,1/4,2/1 (1/16") 2/1dr,8/16dr,7/1dr, 7/10dr, 7/2dr |
| 2 | 20 | 80 | 1.5 | 8 | 1 | 3 | 0.25 | (1/8") 22/12,10/33,8/23,8/8, 10/22 (1/16") 32/39,27/9,28/6,21/51, 15/6 |
| 3 | 20 | 80 | 1.5 | 8 | 1 | 3 | 0.20 | (1/16") 14/24,24/4,29/6,19/34, 21/35 |
| 4 | 20 | 80 | 1.5 | 8 | 1 | 3 | 0.15 | (1/16") 29/10,24/19,22/47,29/0, 34/7 |
| 5 | 20 | 80 | 1.5 | 8 | 1 | 3 | 0.10 | (1/16") 34/3,29/30,22/7,17/41/ 26/47 very slight bar sag. |
| 6* | 50 | 50 | 1.5 | — | — | — | 0.50 | (1/8") burns completely |

[1]Cosden 825TV
[2]tetrabromobisphenol-A
[3]triphenylphosphate
[4]antimony oxide
[5]polytetrafluoroethylene (Teflon, Dupont)
(1/8") 2 1/2" × 1/2" × 1/8" test bar
(1/16") 5" × 1/2" × 1/16" test bar The first number of each pair separated by a slash (/) refers to the self-extinguishing time (in sec.) after the first 10-sec. ignition; the second number refers to the second SE time.
dr dripping observed at some time after ignition.
*control Table I shows that tetrabromobisphenol-A, by itself, does not prevent dripping but that the addition of polytetrafluoroethylene to these compositions results in a non-dripping composition even at 0.1 parts by weight. The composition of control Example 6 shows that by itself, the polytetrafluoroethylene does not exert any appreciable flame retardant effect. When dripping is prevented, the total burning time may be increased because the "drip" has a cooling effect on a burning polymer. By delaying dripping, therefore, heat is retained in the sample and greater flame propagation may result. Also, when dripping is delayed, sagging of the sample may induce cracks in the surface of the charred sample which furnish fresh fuel supplies for the propagating flame.

EXAMPLES 7-8

These examples show the effect of polytetrafluoroethylene with a phosphorus flame retardant.

TABLE II

| Example | poly(2,6-dimethyl-1,4-phenylene) ether | rubber-modified high impact polystyrene[1] | polyethylene | triphenylphosphate | tridecylphosphite | PTFE[2] | UL-94 Self-Extinguishing Times (sec.) |
|---|---|---|---|---|---|---|---|
| 7* | 40 | 60 | 1.5 | 9 | 1 | — | (1/16") 20/drip, 5/9, 4/drip |
| 8 | 40 | 60 | 1.5 | 9 | 0.5 | 0.1 | (1/16") 16/14,10/17, 17/12,19/22,94/—,11/27, 21/19,22/27,13/12,11/12. |

[1]Monsanto HT-91 grade of high-impact polystyrene
[2]polytetrafluoroethylene (Teflon, Dupont)
*control
(a) in addition to the above ingredients, Example 7 also contains 0.25 phr zinc sulfide (as a thermal stabilizer).
(b) Example 8 also contains approximately 6 phr of titania pigment.

EXAMPLES 9-14

These examples show the effect of polytetrafluoroethylene in combination with hexabromobenzene in a polyphenylene ether and styrene resin composition.

TABLE III

| Example | poly(2,6-dimethyl-1,4-phenylene) ether | rubber-modified high impact polystyrene[1] | polyethylene | HBB[1] | TPP[2] | AO[3] | PTFE[4] | Aroclor 1268[5] | UL-94 Self-Extinguishing Times (sec.) |
|---|---|---|---|---|---|---|---|---|---|
| 9* | 20 | 80 | 1.5 | — | — | — | 1 | — | (1/8") BURNS |
| 10* | 20 | 80 | 1.5 | — | — | — | 3 | — | (1/8") BURNS |
| 11 | 20 | 80 | 1.5 | 5 | 1 | 3 | — | — | (1/8") 2/1,3/7,1/3 (1/16") 10/7*,11/5* |
| 12 | 20 | 80 | 1.5 | 5 | 1 | 3 | 1 | — | (1/8") 45/17,17/42, 36/0 (1/16") 40/0,70/17 |
| 13 | 40 | 60 (crystal polystyrene) | — | — | 5 | — | — | 5 | (1/8") 4/5,4/6,3/9 (1/16") 10/17,20/**, 12/13 |
| 14 | 40 | 60 | — | — | 5 | — | 1/2 | 5 | (1/8") 4/30,7/11, 16/2 (1/16") 10/14,35/1, 11/21 |

*control
[1] hexabromobenzene
[2] triphenylphosphate
[3] antimony oxide
[4] polytetrafluoroethylene (Teflon, Dupont)
[5] highly chlorinated diphenyl, Monsanto

EXAMPLES 15-18

These examples show the effect of polytetrafluoroethylene in an ABS composition that contains a halogenated flame retardant.

TABLE IV

| Example | ABS[1] | PTFE[2] | UL-94 SE Times (sec) (5" × 1/2" × 1/16" Specimen) | HDT | TYS | TUS | TE | ZIMP | GIMP | GL |
|---|---|---|---|---|---|---|---|---|---|---|
| 15* | 100 | none | 2/5dr,3/2dr,1/pdr,1/3dr 1/4dr,1/3dr,1/drig,1/3dr, 1/2dr, 1/4dr | 184 | 6460 | 5060 | 20.6 | 1.08 | 10-15 | 52.2 |
| 16 | 100 | 0.5 | 1/32dr,1/24dr,1/20dr, 1/38dr, 1/6,1/33dr,1/4, 1/28dr,3/16,1/4 | 184 | 6380 | 5140 | 18.0 | 1.08 | 10-15 | 53.2 |
| 17 | 100 | 1.0 | 1/4,1/3,1/7,1/10,1/9, 1/45,1/15,1/5,3/30,1/3 | 186 | 5420 | 5140 | 22.3 | 0.93 | 10-15 | 51.0 |
| 18 | 100 | 2.0 | 1/15,1/3,1/21,1/3,1/2, 1/2,1/27,1/4,1/10,1/1 | 186 | 6500 | 5260 | 18.0 | 1.03 | 15 | 53.0 |

*Control
[1] Cycolac KJ, and ABS copolymer that contains a chlorinated flame retardant Diels-Alder adduct having a total of 12.9% by weight of chlorine based on total composition.
[2] polytetrafluoroethylene (Teflon, Dupont)
dr-dripped after the number of seconds indicated
drig-dripped during ignition
pdr-dripped, but after the flame had extinguished
HDT-Heat-deflection temperature at 264 psi (in °F.) (ASTM-D648)
TYS-,TUS, TE- Tensile yield strength (psi), ultimate strength (psi), and elongation (%) (ASTM-D638)
ZIMP-Notched Izod Impact strength (ft-lbs/in-notch) (ASTM-D256)
GIMP-Gardner (drop-dart) impact resistance (ft-lbs)
GL-45° gloss (gloss units)

Obviously, other modifications and variations of the present invention are possible in the light of the above teachings. It is, therefore, to be understood that changes may be made in the particular embodiments of the invention described with are within the full intended scope of the invention as defined by the appended claims.

We claim:

1. A flame retardant, one-dripping thermoplastic molding composition which comprises:
   (a) from 10-95 parts by weight of normally flammable polyphenylene ether resin;
   (b) from 5-90 parts by weight of a vinyl aromatic resin;
   (c) a flame retardant additive in a minor proportion based on said thermoplastic molding composition but in an amount sufficient to render said thermoplastic composition non-burning or self-extinguishing; and
   (d) A polytetrafluoroethylene resin in a minor proportion based on said thermoplastic molding composition in an amount at least sufficient to render said thermoplastic molding composition non-dripping.

2. A composition as defined in claim 1 which includes from 0.1 to 0.25 parts by weight per hundred parts by weight of the composition of the polytetrafluoroethylene.

3. A flame retardant, non-dripping thermoplastic molding composition which comprises:
   (a) from 10-95 parts by weight of a normally flamable polyphenylene ether resin;
   (b) from 5-90 parts by weight of a vinyl aromatic resin;

(c) from 2 to 25 parts by weight per hundred parts by weight of the composition of a flame retardant additive; and
(d) from 0.1 to 0.25 parts by weight per hundred parts by weight of the composition of polytetrafluoroethylene.

4. A flame retardant composition as defined in claim 3 wherein the polyphenylene ether resin has units of the formula:

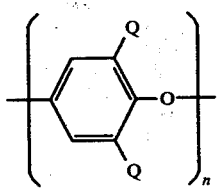

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonxy radicals and halohydrocarbonoxy radicals having at least two carbon atoms between the halogen atom and the phenyl nucleus.

5. A flame retardant composition as defined in claim 3 wherein said polyphenylene ether resin is poly(2,6-dimethyl-1,4-phenylene) ether.

6. A composition as defined in claim 3 wherein the vinyl aromatic resin is rubber-modified, high-impact polystyrene.

7. A flame retardant composition as defined in claim 3 wherein component (c) is a halogen containing compound, a halogen containing compound in admixture with antimony oxide; elemental phosphorus or a phosphorus compound; a halogen-containing compound in admixture with a phosphorus compound; a compound containing phosphorus-nitrogen bonds; or a mixture of the foregoing, and said compound is present in an amount of from 0.1 to 50 parts by weight per hundred parts of said resin.

8. A flame retardant composition as defined in claim 7 wherein said halogen containing compound is an aromatic halogen containing compound selected from the group consisting of chlorinated benzene, brominated benzene, chlorinated biphenyl, chlorinated terphenyl, brominated biphenyl, brominated terphenyl, a compound comprising two phenyl radicals separated by a divalent alkylene or oxygen group and having at least two substituents selected from the group consisting of chlorine and bromine per phenyl radical; and a mixture thereof.

9. A flame retardant composition as defined in claim 8 wherein said organic halogen compound is tetrabromobisphenol-A.

10. A flame retardant composition as defined in claim 8 wherein said organic halogen compound is hexabromobenzene.

11. A flame retardant composition as defined in claim 8 wherein said organic halogen compound is a chlorinated biphenyl.

12. A flame retardant composition as defined in claim 7 wherein said flame retardant additive is hexabromobenzene in admixture with antimony oxide.

13. A flame retardant composition as defined in claim 7 wherein said flame retardant additive is selected from the group consisting of elemental phosphorus, organic phosphonic acids, phosphonates, phosphinates, phosphonites, phosphinites, phosphine oxides, phosphines, phosphites, phosphates and mixtures thereof.

14. A flame retardant composition as defined in claim 13 wherein said flame retardant additive is triphenylphosphate.

15. A flame retardant composition as defined in claim 7 wherein said flame retardant additive is a mixture of tetrabromobisphenol-A and triphenyl phosphate.

* * * * *

UNITED STATES PATENT AND TRADEMARK OFFICE
CERTIFICATE OF CORRECTION

PATENT NO. : 4,355,126

DATED : October 19, 1982

INVENTOR(S) : William R. Haaf and Donald L. Reinhard

It is certified that error appears in the above-identified patent and that said Letters Patent is hereby corrected as shown below:

Column 9, line 65, "one-dripping" should read

-- non-dripping --.

Signed and Sealed this

Tenth Day of May 1983

[SEAL]

Attest:

GERALD J. MOSSINGHOFF

Attesting Officer

Commissioner of Patents and Trademarks